United States Patent Office 3,346,665
Patented Oct. 10, 1967

3,346,665
PROCESS FOR CURING POLYEPOXIDES WITH PYROMELLITIC DIIMIDE OR ADDUCTS THEREOF AND RESULTING PRODUCTS
Carl G. Schwarzer, Walnut Creek, Calif., assignor to Shell Oil Company, New York, N.Y., a corporation of Delaware
No Drawing. Filed Mar. 15, 1965, Ser. No. 439,922
14 Claims. (Cl. 260—830)

ABSTRACT OF THE DISCLOSURE

High-temperature resistant compositions useful for preparing laminates are prepared by reacting a polyepoxide possessing more than one vicinal epoxy group with pyromellitic diimide or with an adduct thereof.

This invention relates to a process for preparing high-temperature resistant epoxy resins. More particularly, the invention relates to a novel curing agent used in the process and to high-temperature resistant epoxy resins prepared therefrom.

Epoxy resins prepared according to the present invention are particularly useful in providing laminates for use at high temperatures, i.e., up to 650° F., for as long as 30,000 hours.

There is a growing need for resin laminates which are resistant to high temperatures, e.g., materials employed in airplanes and space craft. Resin laminates presently available do not possess the requisite characteristics for such application, i.e., high strength at high temperatures over extended periods of time.

It is, therefore, a primary object of the present invention to provide plastic laminates for long time, high temperature use. This and other objects of the invention will apparent from the following detailed description thereof.

It has now been discovered that this and other objects may be accomplished by a process which provides epoxy resin laminates comprising reacting an epoxy resin with a curing agent comprising a diimide which is either pyromellitic or the reaction product of 2 moles of said diimide and 1 mole of a dihalide of a dicarboxylic acid. Laminates prepared from epoxy resins have been cured with these diimides have high temperature resistance over long periods of time. A characteristic of these diimide cured systems is their improvement in flexural strength and flexural modulus of elasticity on aging at elevated temperatures, i.e., 500° F. to 650° F. and higher.

The curing agent used in preparing the epoxy resins of the invention comprise pyromellitic diimide of the formula

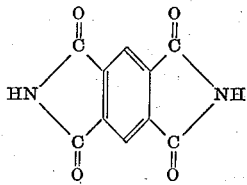

or compounds of the formula

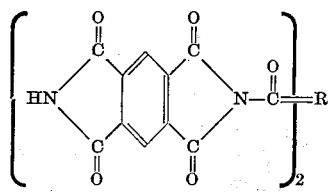

wherein R is a hydrocarbon radical. Compounds containing R are reaction products of stoichiometric amounts of pyromellitic diimide and a dihalide of a dicarboxylic acid, including the dihalides of the aliphatic as well as the aromatic dicarboxylic acids. Examples of suitable dihalides of dicarboxylic acids includes, for example, halides of the formula R=(=COX)$_2$ wherein X is a halide and R is a divalent hydrocarbon radical. Preferably R is an alkylene or phenylene radical. The preferred dihalides of dicarboxylic acids, therefore, include butanedioyl chloride, hexanedioyl chloride, phthaloyl chloride, isophthaloyl chloride and terephthaloyl chloride. Particularly preferred are the dihalides of dicarboxylic acids wherein R is a phenylene radical. Any suitable solvent may be employed in reacting the dihalide and pyromellitic diimide, such as sulfolane (hydrogenated butadiene sulfur dioxide adduct) and dimethyl sulfoxide.

Pyromellitic diimide may be prepared by neutralization of pyromellitic dianhydride in methyl alcohol with excess aqueous ammonium hydroxide to form the primary ammonium salt. The salt is heated, splitting off ammonia and water, leaving pyromellitic diimide.

For simplicity and clarity in describing the invention, the term "the diimide" as used in this specification has reference to pyromellitic diimide and compounds of the formula

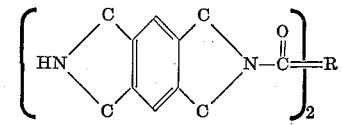

defined above.

Polyepoxides curable with the curing agents of the invention to prepare the high temperature resistant epoxy resins comprise those materials possessing more than one vicinal epoxy group, i.e., more than one

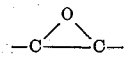

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms in epoxy equivalent values. The meaning of this expression is described in U.S. 2,633,458. The polyepoxides used in the present invention are those having an epoxy equivalent greater than 1.0.

Polyepoxides which are particularly suitable for cure with "the diimide" to form resins of thermal stability include, (1) glycidyl ethers of polyphenols, (2) glycidyl ethers of polyphenyl ethers, (3) glycidyl aromatics, (4) glycidyl ethers of polynuclear aromatic, and (5) glycidyl ether-glycidyl benzenes.

The glycidyl ethers of polyphenols may be obtained by reacting epichlorohydrin with the desired polyphenols in the presence of alkali. Suitable polyphenols include: 2,2-bis(4 - hydroxyphenyl)propane; 1,1',2,2' - tetrakis(4-hydroxyphenyl)ethane; a,a,a',a',a'',a'' - hexakis - (4-hydroxyphenyl) - 1,3,5 - triethylbenzene; 1,3,5 - trihydroxybenzene; and 1,1,5,5-tetrakis-(hydroxyphenyl)pentane. Other examples includes the glycidated novolacs as obtained by reacting epichlorohydrin with resins obtained by condensation of an aldehyde with polyhydric phenols. Also included are the resins made by epoxidation of o-cresol-formaldehyde novolacs. In preparing the glycidyl ethers of polyphenols favorable results are obtained when epichlorohydrin is applied in about a 4:1 molar excess over the phenolic hydroxyl content of the phenol, i.e., in the case of 2,2-bis(hydroxyphenyl)propane, eight moles of epichlorohydrin would be applied per mole of said propane.

Examples of suitable glycidyl ethers of polyphenyl ethers include the compounds diglycidyl ether of dihydroxydiphenyl oxide and polyglycidyl ether of diresorcyl sulfide.

An example of a suitable glycidyl aromatics includes 1,3,5-tri(epoxyethyl)benzene.

The glycidyl ethers of polynuclear aromatics include the diglycidyl ethers of naphthalenediols, such as 1,5- and 2,7-naphthalenediol, and polyglycidyl ethers of 2,7-naphthalenediol, novolac having the formula

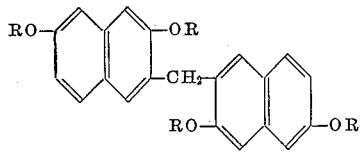

wherein R is

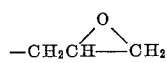

The glycidyl ether-glycidyl benzenes may be represented by the polyepoxide of the formula

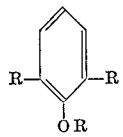

wherein R is as defined above.

Of the five classes of epoxide resins described above the glycidyl ethers of polyphenols are best in thermal stability and are, therefore, the preferred class in preparing the high temperature resistant laminates of the invention. The glycidyl ethers of polyphenols that are particularly preferred are: the glycidyl ethers of 2,2-bis(4-hydroxyphenyl)propane referred to as bis-phenol A; the polyglycidyl ether of a polyphenol prepared from phenol and glyoxal having the structural formula

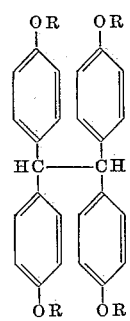

the polyglycidyl ether of a,a,a',a',a'',a''-hexakis(hydroxyphenyl)-1,3,5-triethylbenzene; the polyglycidyl ether of p,p',p'',p''' - tetrakis(2 - methyl-p-hydroxyphenyl)ethane; and polyglycidyl ethers of various polyphenols based on 2,2-bis(hydroxyphenyl)propane. The latter group of ethers include those derived from a series of resins which are prepared by reacting phenol with bis-phenol A using formaldehyde to form the connecting bridges, for example the polyphenol

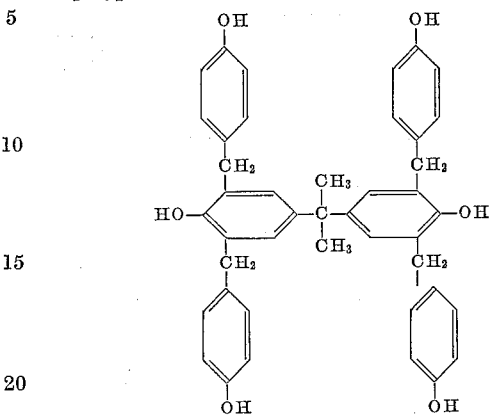

The above polyphenol is prepared by reacting BPA (bis-phenol A) and formaldehyde in a 1:4 mole ratio under alkaline conditions to form tetramethylol bisphenol A of the formula

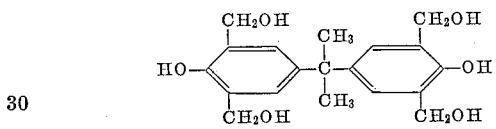

The polyphenol is then prepared by combining the tetramethylol bisphenol A with five-fold excess of phenol. The polyphenol is converted to the corresponding polyglycidyl ether by reaction with epichlorohydrin in a mole ratio of 24:1, epichlorohydrin to polyphenol, i.e., 4:1 molar excess of epichlorohydrin over the phenolic content of the phenol. Another ether includes the glycidyl ether of the polyphenol prepared by reacting bis-phenol A with formaldehyde under acid condition and directly linking several molecules of bis-phenol A by methylene bridges, the molecular weight of the resin depending on the ratio of bis-phenol A to formaldehyde, illustrated by the structural formula where

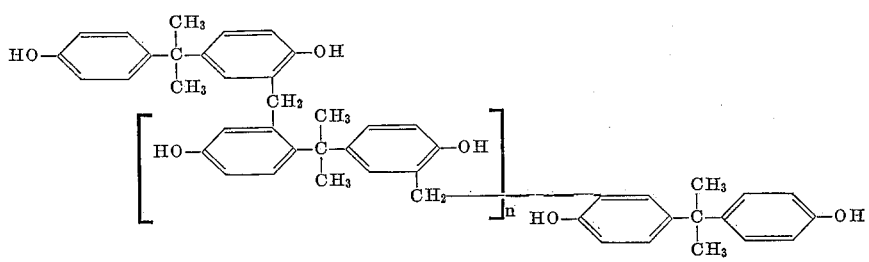

$n$ is a positive number.

Also preferred are the epoxylated novolac resins which are prepared by reacting epichlorohydrin with a phenolic resin prepared from reacting phenol and formaldehyde. These glycidyl ethers have the structural formula

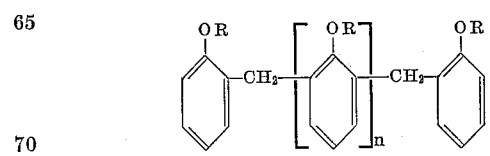

wherein $n$ is from 0 to 1.6.

The quantities in which the polyepoxides and curing agent are combined will vary over a wide range. To obtain the best cure, the pyromellitic diimide is employed in at least a stoichiometric amount which usually varies from about 20 to 70 parts by weight per hundred parts by weight of resin, conveniently expressed as 20 to 70 phr., depending upon the character of the resin, i.e., functional groups.

Pyromellitic diimide can be used in combination with catalytic amounts of other components, such as triphenylphosphine and benzyldimethylamine.

The above-noted additives are generally employed in amounts varying from 0.1 to 25 phr.

The curing of the polyepoxides is accomplished by mixing the polyepoxide with "the diimide" and heating the resulting composition at elevated temperatures, i.e., temperatures ranging from about 250° F. to 650° F. In general, temperatures ranging from about 350° F. to 500° F. will give satisfactory results. Additional materials, such as pigments, stabilizers, plasticizers, diluents and the like, may also be incorporated into the composition. One may also add material to accelerate the reaction of the curing agent, such as phenols, amines, mercaptans and the like.

The compositions of the invention are useful in high temperature applications. They are heat resistant and laminates prepared therefrom and are characterized in their improvement high flexural strengths and flexural modulus of elasticity on aging at elevated temperatures, i.e., temperatures of 500° F. to 650° F. and higher.

In preparing laminates from the compositions of the invention, sheets of fibrous material are first treated with the mixture of polyepoxide and "the diimide." This is conveniently accomplished by spreading the paste or solution containing the above-noted mixture onto the sheets or glass cloth, paper, textile, etc. The sheets are then superimposed and the assembly cured under heat and pressure. The assembly is preferably cured in a heated press under a pressure of from about 25 to 500 p.s.i. and temperatures of from 312° F.

The fibrous material used in the preparation of the laminates may be of any suitable materials, such as glass cloth and matting, paper, asbestos paper, mica flakes, cotton bats, duck muslin, canvas or synthetic fibers such as nylons, dacron, and the like. It is usually preferred to use woven glass cloth that has been given prior treatment with well-known finishing or sizing agents therefor, such as chrome methacrylate or vinyl trichlorosilane.

Example 1

382 g. (1 mole) of 1,1',2,2'-tetrakis(p-hydroxyphenyl) ethane and 1580 g. (16 moles) of epichlorohydrin are introduced into a glass kettle equipped with a stirrer, reflux condenser and thermometer. Sufficient water is added to bring the water content to about 1% by weight. The solution is brought to reflux (158°–167° F.), and a 45% by weight aqueous solution of sodium hydroxide is added dropwise until 95% of the calculated amount of caustic, based upon the phenolic hydroxyl content, is added. The addition being made over a 30 minute period. The reaction is continued for one hour at which excess epichlorohydrin is removed. The resin is then heated to 248°–266° F. under reduced pressure (20–30 mm.). An equal volume of methyl isobutyl ketone is added and the solution filtered to remove salt (NaCl). This solution is then refluxed with an equal volume of 5% aqueous NaOH for one hour to remove residual chlorohydrin. The layers are then separated and the organic phase is neutralized followed by a water wash. The solvent is removed by distillation and the resinous bottoms are held at 302° F./5 mm. Hg for about 10 minutes to assure complete removal of solvent. For convenience the product will hereinafter be referred to as polyglycidyl ether A.

Employing the precondensate technique one mole of the polyglycidyl ether of BPA having a molecular weight of about 380 and having an epoxide equivalent of from 175–210 is condensed with two moles of pyromellitic diimed ta 250° C. for about 45 minutes. The product is designated as condensate A and contains 46 parts by weight of the polyglycidyl ether per 54.5 parts by weight of pyromellitic diimide.

A system is then prepared consisting of 54 parts of polyglycidyl ether A and 99.5 parts of condensate A.

Four-ply laminates, 3 inches by 4 inches, are prepared using a glass cloth as described hereinbefore. The laminates are post-cured three hours at 400° F. and an additional 24 hours at 500° F.

Tests, enumerated in Table 1, were carried out on the laminates. Flexural strength is the resistance of a material to bending stresses. The laminate is subjected to center loads, and the value at which permanent distortion or fail occurs expressed in pounds per square inch (p.s.i.) Flexural modulus of elasticity is the ratio of stress to unit strain expressed in p.s.i.

TABLE 1.—LAMINATES FROM EPON RESIN SYSTEM CURED WITH PYROMELLITIC DIIMIDE (PRECONDENSATE TECHNIQUE) [1]

[System.—54 parts polyglycidyl ether A, 46 parts polyglycidyl ether of BPA (mol wt. of about 380), 54.5 parts PMDI]

| Laminate | Flexural Strength, p.s.i.×10⁻³ | Modulus, Initial E, p.s.i.×10⁻⁶ | Percent Weight Loss on Aging | | | | | |
|---|---|---|---|---|---|---|---|---|
| | | | 24 Hours | | 72 Hours | | 192 Hours | |
| | | | 500° F. | 550° F. | 500° F. | 550° F. | 500° F. | 550° F. |
| Laminate No. 1: | | | | | | | | |
| Room temperature | 85.3, 86.3 | 3.04, 3.08 | 1.07 | 2.75 | 2.03 | 4.8 | 3.25 | 8.0 |
| 500° F | 10.66, 10.69 | 1.061, 0.910 | | | | | | |
| 500° F. after 192 hours | 13.85, 14.14 | 1.38, 1.33 | | | | | | |
| 550° F. after 192 hours | 38.42, 33.37 | 2.38, 2.03 | | | | | | |
| Laminate No. 2: | | | | | | | | |
| Room temperature | 88.14, 87.64, 88.25 | 3.28, 3.21, 3.04 | 1.13 | 2.45 | 2.10 | 4.4 | 3.25 | 7.0 |
| 500° F | 10.42, 10.68 | 0.982, 0.950 | | | | | | |
| 500° F. after 192 hours | 13.42, 14.5 | 1.40, 1.48 | | | | | | |
| 550° F. after 192 hours | 45.26 | 2.38, 2.34 | | | | | | |

[1] The precondensate technique involved the "condensation" of one mole of polyglycidyl ether of BPA (mol wt. of about 380) with two moles of pyromellitic diimide at 250° C. for about 45 minutes. This product was cross-linked with polyglycidyl ether A during cure.

To illustrate the manner in which the invention may be carried out, the following examples are given. It is understood, however, that the examples are for purposes of illustration and the invention is not to be regarded as limited to any specific materials or conditions therein. Parts as used in the examples has reference to parts by weight.

Example 2

A polyepoxide composition is prepared which consists of 50 parts polyglycidyl ether A, 50 parts of the polyglycidyl ether of BPA, described in Example 1 and having a molecular weight of about 380, and 53 parts pyromellitic diimide. Four-ply laminates are prepared as in Example 1. Results obtained from testing the laminates is given in Table 2.

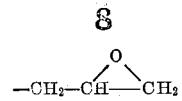

TABLE 2.—LAMINATE FROM EPON RESIN CURED WITH PYROMELLITIC DIIMIDE
[System.—50 parts polyglycidyl ether A, 50 parts polyglycidyl ether of BPA (mol wt. of about 380), 53 parts PMDI]

| Laminate | Flexural Strength, p.s.i.×10⁻³ | Modulus, Initial E, p.s.i.×10⁻⁵ | Percent Weight Loss on Aging | | | | | |
|---|---|---|---|---|---|---|---|---|
| | | | 24 Hours | | 72 Hours | | 192 Hours | |
| | | | 500° F. | 550° F. | 500° F. | 550° F. | 500° F. | 550° F. |
| Room temperature | 82.31, 79.11 | 2.73, 2.87 | 1.05 | 2.5 | 2.04 | 4.5 | 3.3 | 7.0 |
| 500° F | 12.01, 9.38 | 0.879, 0.727 | | | | | | |
| 500° F. after 192 hours | 15.24, 17.40 | 1.37, 1.52 | | | | | | |
| 550° F. after 192 hours | 38.25, 39.80 | 2.17, 2.01 | | | | | | |

Example 3

The procedure of Example 1 is repeated with the exception that an equivalent amount of the diimide having the formula is prepared by reacting epichlorohydrin with a phenolic resin which is the reaction product of phenol and formaldehyde.

Four-ply laminates are prepared as in Example 1 from an epoxy composition consisting of 100 parts of the above epoxylated novolac and 61.5 parts pyromellitic diimide. Results obtained from testing the laminates is given in Table 3.

TABLE 3.—LAMINATES FROM EPOXYLATE NOVOLAC RESIN CURED WITH PYROMELLITIC DIIMIDE
[System.—100 parts epoxylate novolac resin (mol wt. about 650), 61.5 parts PMDI]

| Laminate | Flexural Strength, p.s.i.×10⁻³ | Modulus, Initial E, p.s.i.×10⁻⁶ | Percent Weight Loss on Aging | | | | | |
|---|---|---|---|---|---|---|---|---|
| | | | 24 Hours | | 72 Hours | | 192 Hours | |
| | | | 500° F. | 550° F. | 500° F. | 550° F. | 500° F. | 550° F. |
| Laminate No. 1: | | | | | | | | |
| Room temperature | 72.75, 75.86 | 2.70, 2.79 | 1.25 | 3.4 | 2.35 | 6.6 | 4.0 | 13.0 |
| 500° F | 13.60, 14.75 | 1.21, 1.18 | | | | | | |
| 500° F. after 192 hours | 20.44, 19.79 | 1.63, 1.54 | | | | | | |
| 550° F. after 192 hours | 17.57, 17.20 | 1.63, 0.943 | | | | | | |
| Laminate No. 2: | | | | | | | | |
| Room temperature | 77.66, 74.29 | 2.75, 2.67 | 1.75 | 4.1 | 3.2 | 7.0 | 5.0 | 12.4 |
| 500° F | 17.09, 16.10 | 1.44, 1.37 | | | | | | |
| 500° F. after 192 hours | 18.97, 21.39 | 1.57, 1.72 | | | | | | |
| 550° F. after 192 hours | 28.21, 30.78 | 2.03, 1.82 | | | | | | |

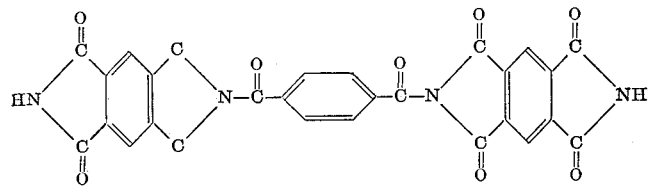

is used in place of pyromellitic diimide. Similar results are obtained.

Example 4

An epoxylated novolac resin having a molecular weight of about 650 and the structural formula

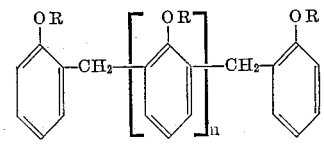

where R is

Example 5

An epoxylated novolac resin is prepared as in Example 3 except that the molecular weight range of the resin is 300–500.

Four-ply laminates are prepared as in Example 1 from an epoxy composition consisting of 100 parts of the above epoxylated resin, 40 parts pyromellitic diimide and 1 part triphenylphosphine. Results obtained from testing the laminates is given in Table 4.

TABLE 4.—LAMINATES FROM EPOXYLATE NOVOLAC RESIN CURED WITH PYROMELLITIC DIIMIDE

[System.—100 parts epoxylate novolac resin (mol wt. 300–500), 40 parts PMDI, 1 part triphenylphosphine]

| Laminate No. | Flexural Strength, p.s.i.×10⁻³ | | | | Modulus, p.s.i.×10⁻⁶ | | | | Percent Weight Loss on Aging, 500° F. (192 hrs.) |
|---|---|---|---|---|---|---|---|---|---|
| | 73° F. | 500° F. (10 min.) | 500° F. (192 hrs.) | 650° F. (192 hrs. at 500° F.) | 73° F. | 500° F. (10 min.) | 500° F. (192 hrs.) | 650° F. (192 hrs. at 500° F.) | |
| 1 (27% Resin) | 91 | 8 | 22.5 | 12 | 2.6 | 0.8 | 1.56 | 1.1 | 2.4 |
| 2 (30% Resin) | 75 | 5 | 45.6 | 14 | 2.33 | 0.4 | 1.90 | 1.0 | 3.3 |

I claim as my invention:

1. A process for providing cured polyepoxide systems having improved properties at elevated temperatures which comprises
    (a) mixing a stoichiometric amount of a diimide selected from the group consisting of pyromellitic diimide and the compound formed by reacting 2 moles of pyromellitic diimide and 1 mole of a dihalide of a dicarboxylic acid with a polyepoxide possessing more than one vicinal epoxy group, and
    (b) heating the resulting mixture at a temperature ranging from about 250° to 650° F.

2. A process according to claim 1 wherein said diimide is pyromellitic diimide.

3. A process according to claim 2 wherein the polyepoxide is the polyglycidyl ether of 1,1′,2,2′-tetrakis(p-hydroxyphenyl)ethane.

4. A process according to claim 2 wherein the polyepoxide is a polyglycidyl ether of 2,2-bis(4-hydroxyphenyl)propane.

5. A process according to claim 2 wherein said polyepoxide is a mixture of the polyglycidyl ether of 1,1′,2,2′-tetrakis(p-hydroxyphenyl)ethane and a polyglycidyl ether of 2,2-bis(4-hydroxyphenyl)propane.

6. A process according to claim 2 wherein the polyepoxide is an epoxylated novolac resin.

7. A process according to claim 1 wherein the diimide is the reaction product of two moles of pyromellitic diimide and 1 mole of terephthaloyl chloride.

8. A curable polyepoxy composition comprising a polyepoxide and a stoichiometric amount of a diimide selected from the group consisting of pyromellitic diimide and the compound formed by reacting 2 moles of pyromellitic diimide and 1 mole of a dihalide of a dicarboxylic acid with a polyepoxide possessing more than one vicinal epoxy group, and heating the resulting mixture at a temperature ranging from about 250° to 650° F.

9. A composition according to claim 8 wherein the diimide is pyromellitic diimide.

10. A composition according to claim 8 wherein the diimide is the reaction product of two moles of pyromellitic diimide and 1 mole of terephthaloyl chloride.

11. A composition according to claim 8 wherein the polyepoxide is an epoxylated novolac resin.

12. A composition according to claim 8 wherein the polyepoxide is the polyglycidyl ether of 1,1′,2,2′-tetrakis(p-hydroxyphenyl)ethane.

13. A composition according to claim 8 wherein said polyepoxide is a polyglycidyl ether of 2,2-bis(4-hydroxyphenyl)propane.

14. A composition according to claim 8 wherein said polyepoxide is a mixture of the polyglycidyl ether of 1,1′,2,2′-tetrakis(p-hydroxyphenyl)ethane and a polyglycidyl ether of 2,2-bis(4-hydroxyphenyl)propane.

No references cited.

GEORGE F. LESMES, *Primary Examiner.*

MURRAY TILLMAN, *Examiner.*

PAUL LIEBERMAN, *Assistant Examiner.*